Jan. 18, 1938.    H. J. TUTHILL    2,105,708
APPARATUS FOR USE IN MAKING DRAWINGS
Original Filed June 6, 1935
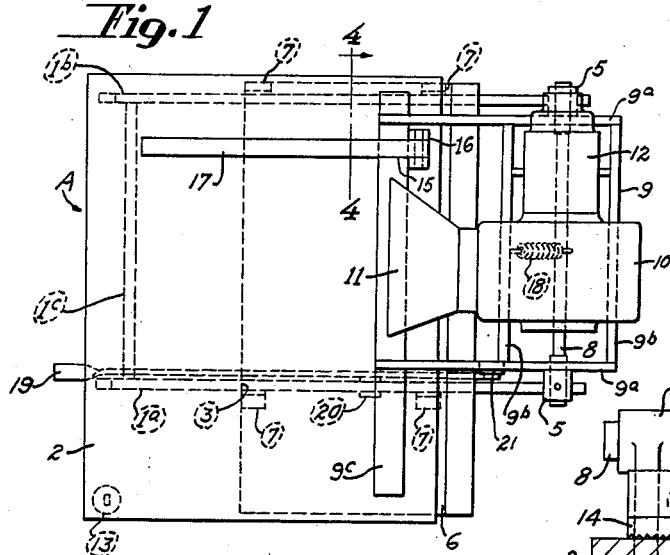
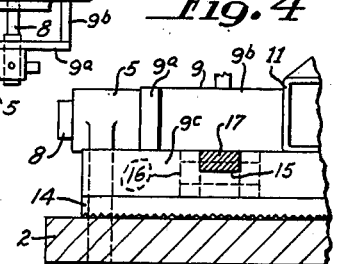
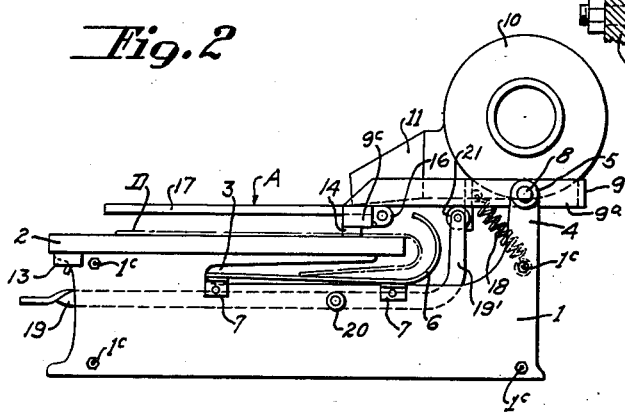
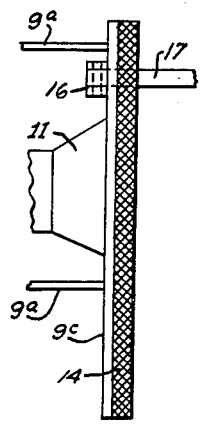
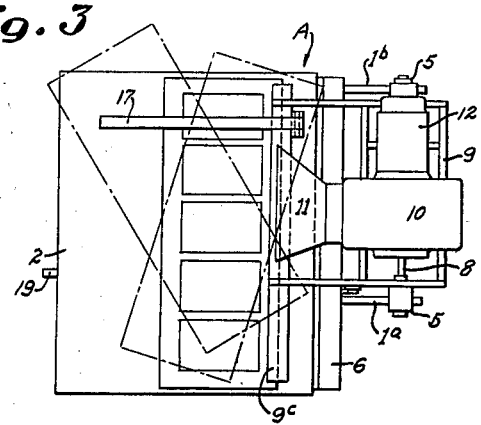
INVENTOR
H. J. TUTHILL
BY J. H. Cook
ATTORNEY Patented Jan. 18, 1938

2,105,708

UNITED STATES PATENT OFFICE 2,105,708

APPARATUS FOR USE IN MAKING DRAWINGS

Harry J. Tuthill, Ferguson, Mo.

Application June 6, 1935, Serial No. 25,259
Renewed June 21, 1937

5 Claims. (Cl. 41—4)

This invention relates generally to apparatus adapted for use in making drawings, and more specifically to such an apparatus which is capable of being employed in making drawings in accordance with an improved method on which an application for United States Letters Patent, Serial No. 695,306, was filed on October 23, 1933, which application matured into United States Letters Patent 2,013,796 issued September 10, 1935, the predominant object of the present invention being to produce an apparatus of such improved construction and arrangement that it will perform its intended function in a very efficient manner, and render quite convenient the making of drawings in accordance with the improved method referred to above.

The improved method disclosed in the application for Letters Patent identified above is intended to enable an artist to obtain certain artistic effects heretofore usually obtained through the use of the Ben Day process, but in a manner which is quite simple when compared with said Ben Day process. In accordance with the invention mentioned a distributing element is employed for the purpose of applying to a drawing a plurality of parallel lines of a substance in the form of rubber cement. These parallel lines of rubber cement may be applied to a drawing in a manner to ultimately produce on the drawing, when ink is applied thereto, a plurality of parallel, drawn lines, or said rubber cement may be applied so that the ultimate artistic effect obtained is a plurality of drawn lines on the drawing extending at angles relative to each other, or the effect obtained on the drawing may be a great multiplicity of minute dots. The distributing element employed in accordance with the invention referred to above is provided with a toothed lower edge, and after rubber cement has been applied to such toothed lower edge the element is pressed firmly against the surface of the drawing paper and is drawn rapidly across the portion of the drawing which is to receive the artistic effect being produced, the body of rubber cement being distributed along the surface of the drawing paper as the distributing element is moved relative thereto. After the rubber cement has been applied with the aid of the distributing element and is quickly dried with the aid of air forced into contact with the applied rubber cement, ink is applied to the drawing, and the ink is laid upon the lines of rubber cement as well as upon the exposed portions of the surface of the drawing located between and adjacent to the lines of rubber cement. After the ink has dried, the lines of rubber cement are rubbed away or otherwise removed from the drawing, leaving on the surface of the drawing only the ink which was applied to the exposed portions of the surface of the drawing.

The purpose of this invention, as already stated herein, is to provide an apparatus which is adapted for use in treating drawings in accordance with the method described above, the improved apparatus being illustrated in the accompanying drawing, in which Fig. 1 is a plan view of the apparatus;

Fig. 2 is a side elevation of the apparatus shown in Fig. 1;

Fig. 3 is a view similar to Fig. 1 on a smaller scale and showing the manner in which drawings are introduced into the apparatus when certain artistic effects are desired;

Fig. 4 is an enlarged view taken on line 4—4 of Fig. 1; and

Fig. 5 is an inverted, fragmentary view showing the underside of the element which holds the drawing in place in the apparatus.

In the drawing, wherein is shown for the purpose of illustration, merely, one embodiment of the invention, A designates the improved apparatus generally. The apparatus A includes a base element 1 which supports a suitable top member 2, and this top member, if desired, may be in the form of a drawing board upon which drawings may be made. The base element 1 comprises opposed side members 1ᵃ and 1ᵇ which are connected together by suitable tie rods 1ᶜ. The opposed side members 1ᵃ and 1ᵇ of the base element 1 are provided with cut-away portions 3 which extend forwardly from a point adjacent to the rear edge of the top member 2, as shown most clearly in Fig. 2, and also at the rear end of the base element 1 the side members thereof are provided with upwardly extended supporting portions 4, which are provided at their upper ends with suitable bearings 5. Supported by the opposed side members 1ᵃ and 1ᵇ of the base element 1 and extended into the cut-away portions 3 thereof is a guide 6, which preferably is in the form of a plate that extends transversely of the apparatus approximately from one side edge of the top member 2 to the opposite side edge thereof, as shown most clearly in Fig. 1. The guide 6 is attached to the opposed side members of the base element 1 through the instrumentality of suitable brackets 7, and this guide extends from the forward ends of the cut-away portions 3 rearwardly, and the rear end of the guide is curved upwardly and forwardly about the rear edge of the top member 2. The purpose of this guide is to permit of rather large drawings, such as that suggested by the dotted lines D shown in Fig. 2, to be bent downwardly around the rear edge of the top member 2 and extended forwardly beneath the top member 2. When so disposed the drawing is held in its proper position by the guide 6, and the curved, rear end portion of said guide aids in bending the drawing around the rear edge of the top member 2.

Supported by the extensions 4 for pivotal movement about a rod 8 which is supported by the bearings 5 of said extensions is a frame 9. This frame comprises opposed side members 9ª, transverse members 9ᵇ which extend between and are fixed to said side members 9ª, and a forward transverse member 9ᶜ. The portion of the frame 9 which is provided by the rear portions of the side members 9ª and the transverse members 9ᵇ supports an air-moving apparatus 10 in the form of a fan or blower, and this air-moving apparatus is provided with a flared, air-discharging element 11 which normally is disposed just above the top member 2 of the apparatus, as shown in Fig. 2. The air-moving apparatus has associated with it suitable operating means, for instance, an electric motor 12, this electric motor being suitably wired for operation and being controlled by manipulation of a conveniently located electrical switch 13 which is fixed to the underside of the top member 2 adjacent to the forward edge thereof.

The forward transverse member 9ᶜ of the frame 9 is of greater length than said frame, as shown in Fig. 1, being almost as wide as is the top member 2 of the apparatus. Also, this transverse member 9ᶜ preferably is wider and thicker than the transverse members 9ᵇ of the frame 9 and has fixed to its lower face a strip 14 of material which is provided with a bottom face that is knurled or otherwise roughened. Adjacent to one edge thereof the transverse member 9ᶜ of the frame 9 is provided with a rectangular recess 15 (Fig. 4), and secured to said transverse member 9ᶜ through the instrumentality of a hinge 16 is a straight-edge 17, which is seated in the recess 15 and extends forwardly from the hinge 16 in a position just above the top member 2.

The frame 9 has associated with it a coil spring 18 which is attached at one of its ends to one of the transverse members 9ᵇ of the frame and at its other end to one of the tie rods 1ᶜ of the base element 1, so that said coil spring tends to draw the forward end portion of the frame 9 downwardly about the rod 8. The apparatus A includes means for raising the forward end portion of the frame 9 against the action of the spring 18, and this means comprises an operating lever 19 which is pivoted to one of the side members of the base element 1 at the point designated by the reference character 20. The forward end of the lever 19 is extended slightly beyond the front of the apparatus, and at its rear end said lever is provided with an upwardly extended portion 19' which supports at its upper end a roller 21. The roller 21 contacts with the lower face of one of the side members 9ª of the frame 9, and therefore when the forward end of said lever 19 is depressed the roller 21 carried by said lever will be moved upwardly and forwardly in an arc of a circle to the center of which is the point 20 at which the lever 19 is pivotally supported. This upward movement of the forward portion of the frame 9 is resisted by the coil spring 18, and said coil spring will return the frame to its normal position when the force which moves its forward end upwardly is discontinued.

In the use of the improved apparatus disclosed herein, a drawing to be treated in accordance with the invention disclosed in the United States Letters Patent hereinbefore referred to is arranged in place on the top member 2, said drawing being held in position by the strip 14 fixed to the transverse element 9ᶜ of the frame 9, the knurled bottom face of this strip gripping the drawing tightly while the weight of the forward portion of the frame presses the drawing into close contact with the top face 2. The drawing being properly positioned, the distributing element which is used in treating the drawing is supplied at its toothed edge with the rubber cement which is to be applied to the drawing, and the toothed edge of the distributing element is then drawn rapidly along the drawing with a side edge of the distributing element in sliding contact with the straight-edge 17. In this manner the straight-edge acts as a guide for the distributing element and assures straight lines of rubber cement being laid upon the drawing. If the artistic effect being produced requires that additional straight lines of rubber cement be laid upon the drawing over the first-mentioned straight lines of rubber cement and in a different direction with respect thereto, the position of the drawing is shifted by raising the forward portion of the frame 9 and another operation is gone through in the manner just described to apply additional lines of rubber cement on the drawing. While the lines of rubber cement are being applied to the drawing as described, the electric motor 12 is in operation and air is being discharged from the flared discharge element 11 of the air-moving apparatus 10, so as to cause the rubber cement to become quickly set and thereby prevent bleeding thereof. After the rubber cement has been applied to the drawing and has become set, the straight-edge 17 may be moved upwardly and rearwardly about the hinge 16 so as to get said straight-edge out of the way, and the artist then applies ink to the drawing and performs the other operations necessary to obtain the desired effect.

It frequently happens that a drawing must be shifted a number of times during the various operations required to obtain certain artistic effects, this being particularly true of the drawings from which newspaper comics are produced, and by providing the lever 19 it is a simple matter for the artist whenever the drawing is to be moved to merely depress the forward end of the lever 19, thereby raising the forward end of the frame 9 slightly and releasing the grip on the drawing which is produced by the roughened bottom face of the strip 14 pressing the drawing firmly against the surface of the top member 2.

I claim:

1. An apparatus of the class described comprising a base element, a frame pivotally supported by said base element, an air-moving apparatus mounted on said frame, a drawing-receiving element supported by said base element and positioned so that air is directed by said air-moving apparatus toward the surface of said drawing-receiving element, and drawing-engaging means associated with said frame including an element having a roughened drawing-contacting face for retaining a drawing in place on said drawing-receiving element.

2. An apparatus of the class described comprising a base element, a frame movably supported by said base element, an air-moving apparatus mounted on said frame, a drawing-receiving element supported by said base element, and means mounted on said frame for holding a drawing in place on said drawing-receiving element, said air-moving apparatus being so positioned that air is directed by said air-moving apparatus upon the surface of said drawing.

3. An apparatus of the class described comprising a base element, a frame movably supported by said base element, an air-moving apparatus mounted on said frame, a drawing-receiving element supported by said base element, means mounted on said frame for holding a drawing in place on said drawing-receiving element, said air-moving apparatus being so positioned that air is directed by said air-moving apparatus upon the surface of said drawing, and means for subjecting said frame to pivotal movement.

4. An apparatus of the class described comprising a base element, a frame pivotally supported by said base element, an air-moving apparatus mounted on said frame, a drawing-receiving element supported by said base element and positioned so that air is directed by said air-moving apparatus toward the surface of said drawing-receiving element, drawing-engaging means associated with said frame including an element having a roughened drawing-contacting face for retaining a drawing in place on said drawing-receiving element, and means including a pivotally supported lever for subjecting said frame to pivotal movement.

5. An apparatus of the class described comprising a base element, a frame pivotally supported by said base element, an air-moving apparatus mounted on said frame, a drawing-receiving element supported by said base element and positioned so that air is directed by said air-moving apparatus toward the surface of said drawing-receiving element, a straight-edge hingedly attached to and extended from said frame, means mounted on said frame for holding a drawing in place on said drawing-receiving element, and means including a pivotally supported lever for subjecting said frame to pivotal movement.

HARRY J. TUTHILL.